US012671162B2

(12) United States Patent
Chueh

(10) Patent No.: US 12,671,162 B2
(45) Date of Patent: Jun. 30, 2026

(54) BRANCH-LINE COUPLER

(71) Applicant: Nanning FuLian FuGui Precision Industrial Co., Ltd., Nanning (CN)

(72) Inventor: Yu-Chih Chueh, Hsinchu (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 114 days.

(21) Appl. No.: 18/676,241

(22) Filed: May 28, 2024

(65) Prior Publication Data

US 2025/0372857 A1 Dec. 4, 2025

(51) Int. Cl.
*H01P 5/18* (2006.01)
*H01P 5/22* (2006.01)

(52) U.S. Cl.
CPC ................ *H01P 5/187* (2013.01); *H01P 5/18* (2013.01); *H01P 5/227* (2013.01)

(58) Field of Classification Search
CPC ............. H01P 5/18; H01P 5/187; H01P 5/227
USPC .................................................. 333/109, 116
See application file for complete search history.

(56) References Cited

U.S. PATENT DOCUMENTS

| | | | |
|---|---|---|---|
| 5,369,379 A | 11/1994 | Fujiki | |
| 7,400,214 B2 | 7/2008 | Storniolo et al. | |
| 12,069,799 B2 * | 8/2024 | Chueh | H05K 1/0251 |
| 2018/0123214 A1 | 5/2018 | Goto | |
| 2021/0111590 A1 * | 4/2021 | Kawai | H02J 50/12 |

FOREIGN PATENT DOCUMENTS

| | | |
|---|---|---|
| CN | 2798334 | 7/2006 |
| CN | 104393390 | 3/2015 |
| CN | 111613862 A | 9/2020 |

* cited by examiner

*Primary Examiner* — Andrea Lindgren Baltzell
*Assistant Examiner* — Abigail Amir Yaldo
(74) *Attorney, Agent, or Firm* — ScienBiziP, P.C.

(57) ABSTRACT

A branch-line coupler includes an input port, arranged on a bottom layer of the substrate; an isolated port, arranged on the bottom layer; a first output port, arranged on a top layer of the substrate; a second output port, arranged on the top layer; a ground layer, arranged in a middle layer of the substrate; a first transmission line, connected between the input port and the isolation port; a second transmission line, connected between the first output port and the second output port; a first branch line, connected to the input port; a second branch line, connected to the isolated port; a third branch line, vertically connected to the first output port and connected to the first branch line through a first through hole; and a fourth branch line, vertically connected to the second output port and connected to the second branch line through a second through hole.

10 Claims, 6 Drawing Sheets

BRANCH-LINE COUPLER

FIELD

The present disclosure generally relates to a technical field of microwave transmission, and more particularly to branch-line couplers.

BACKGROUND

It is well-known that directional couplers are usually used to solve the problems relating to power splitting in many microwave circuits. With the development of mobile communication technology and satellite communication technology, for convenient carrying and moving, the miniaturization of communication devices becomes more and more important. However, the conventional 3 dB branch-line coupler occupies a large space of the printed circuit board (PCB). Therefore, a reduction in the area of the branch-line coupler and maintaining its performance is needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
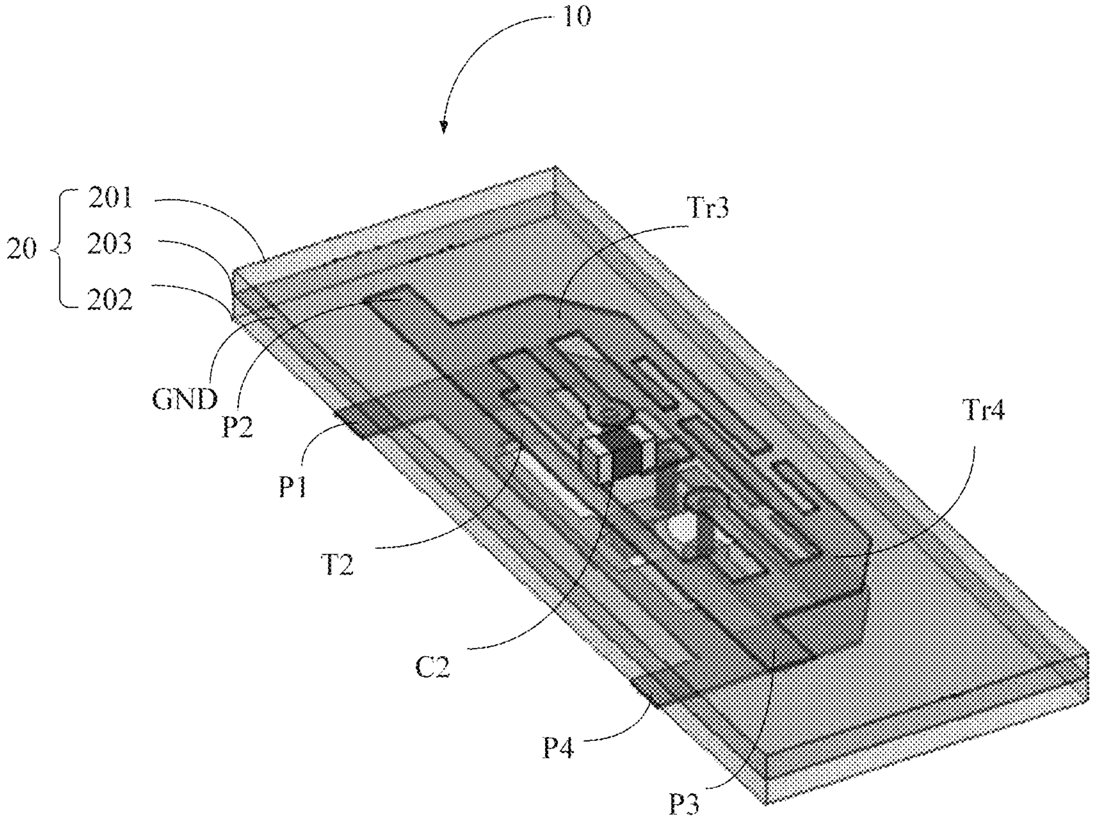
FIG. 1 is a three-dimensional structure diagram of a branch-line coupler according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
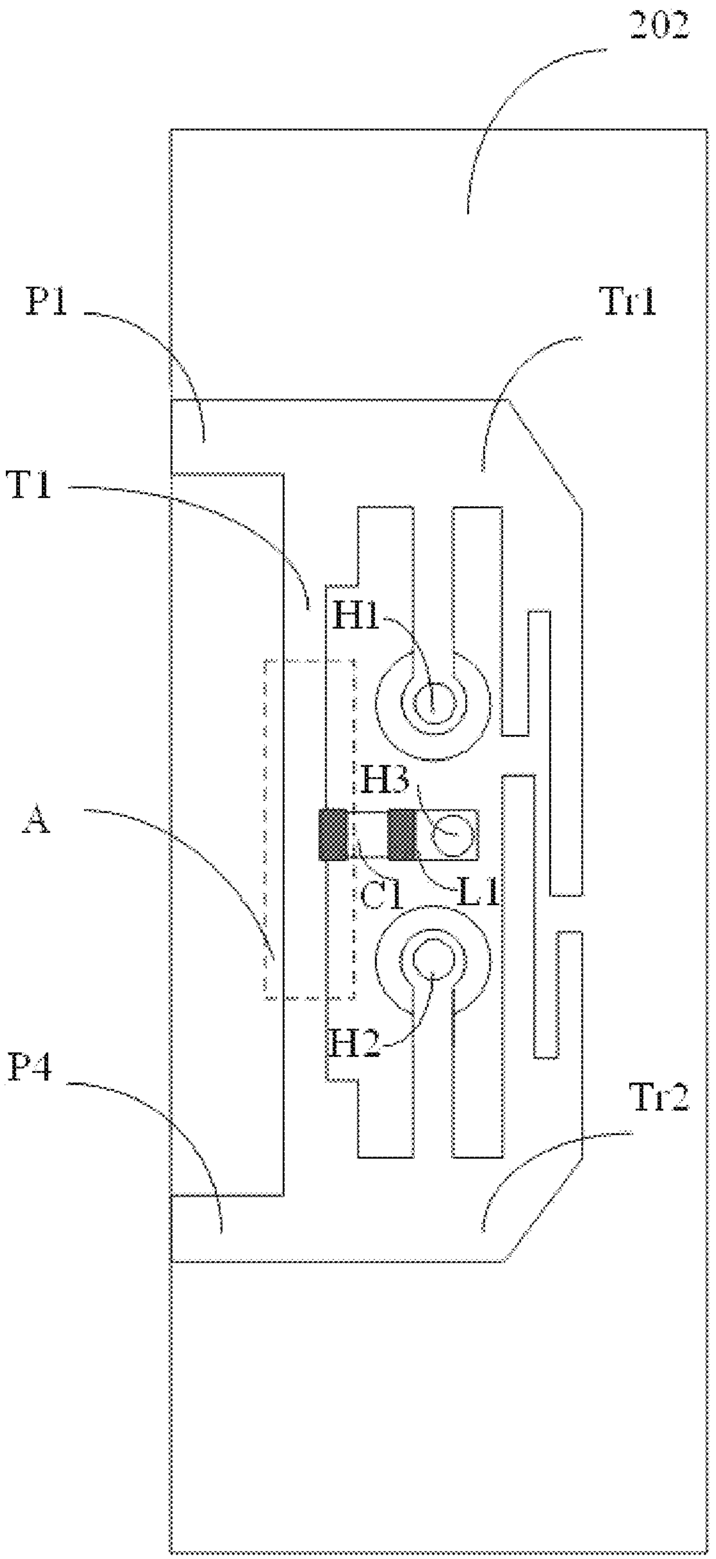
FIG. 2 is a structural diagram of a branch-line coupler on a bottom layer of a substrate according to an embodiment of the present disclosure.
Figure 3:
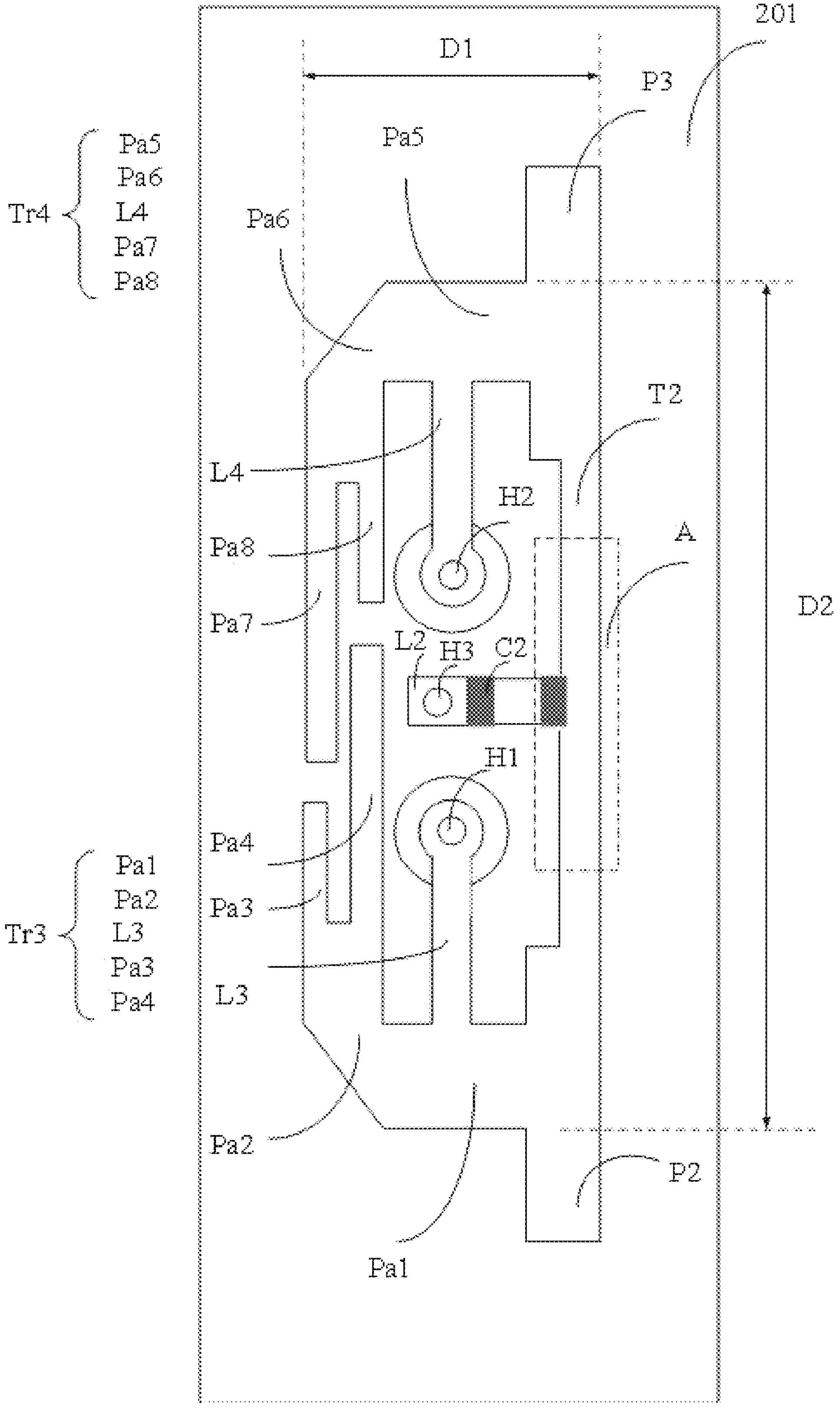
FIG. 3 is a structural diagram of a branch-line coupler on a top layer of a substrate according to an embodiment of the present disclosure.

Referring to FIG. 1-FIG. 3, FIG. 1 is a three-dimensional structure diagram of a branch-line coupler according to an embodiment of the present disclosure, FIG. 2 is a structural diagram of a branch-line coupler on a bottom layer of a substrate according to an embodiment of the present disclosure, and FIG. 3 is a structural diagram of a branch-line coupler on a top layer of a substrate according to an embodiment of the present disclosure. In the embodiment, the branch-line coupler 10 is suitable for microwave circuits. As shown in the Figures, the branch-line coupler 10 is arranged on a substrate 20, the substrate 20 includes a top layer 201, a bottom layer 202 and an intermediate layer 203. The branch-line coupler 10 includes an input port P1, an output port P2, an output port P3, an isolated port P4, a ground layer GND, a first transmission line T1, a second transmission line T2, a first branch line Tr1, a second branch line Tr2, a third branch line Tr3 and a fourth branch line Tr4. Wherein, the transmission lines of the input port P1, the isolation port P4, the first output port P2 and the second output port P3 in FIG. 1 can be configured with different impedance transmission lines according to port matching requirements, and the configuration structure of the above ports is not limited to the present disclosure, and can be defined according to actual applications.

In the embodiment, the input port P1 is arranged on the bottom layer 202 of the substrate 20. The isolated port P4 is arranged on the bottom layer 202 of the substrate 20. The first output port P2 is arranged on the top layer 201 of the substrate 20. The second output port P3 is arranged on the top layer 201 of the substrate 20. The ground layer GND is arranged in the middle layer 203 of the substrate 20. The first transmission line T1 is electrically connected between the input port P1 and the isolation port P4. The second transmission line T2 is electrically connected between the first output port P2 and the second output port P3. The first branch line Tr1 is electrically connected to the input port P1. The second branch line Tr2 is electrically connected to the isolated port P4. The third branch line Tr3 is vertically electrically connected to the first output port P2. The fourth branch line Tr4 is vertically electrically connected to the second output port P3. The first branch line Tr1 and the third branch line Tr3 are electrically connected through a first through hole H1, thus realizing a common ground design of the first branch line Tr1 and the third branch line Tr3. The second branch line Tr2 and the fourth branch line Tr4 are connected through a second through hole H2, thus realizing a common ground design of the second branch line Tr2 and the fourth branch line Tr4.

In the embodiment, the input port P1 and the isolation port P4 are respectively electrically vertically connected to the first transmission line T1. A projection of the input port P1 on the substrate 20 is perpendicular to a projection of the first output port P2 on the substrate 20. A projection of the isolated port P4 on the substrate 20 is perpendicular to a projection of the second output port P3 on the substrate 20. That is, a difference between the first output port P2 and the second output port P3 is 180 degrees.

In the embodiment, the branch-line coupler 10 further includes a first connecting part L1, a second connecting part L2, a first capacitor C1 and a second capacitor C2. The first connecting part L1 is arranged on the bottom layer 202 of the substrate 20. The first capacitor C1 is arranged on the bottom layer 202 of the substrate 20. One end of the first capacitor C1 is electrically connected to the first transmission line T1, and the other end of the capacitor C1 is electrically connected to the first connecting part L1. The second connecting part L2 is arranged on the top layer 201 of the substrate 20 and electrically connected to the ground layer GND and the first connecting part L1 through a third through hole H3 to realize the common ground design. The second capacitor C2 is arranged on the top layer 201 of the substrate 20. One end of the second capacitor C2 is electrically connected to the second transmission line T2, and the other end of the second capacitor C2 is electrically connected to the second connecting part L2.

In the embodiment, the first branch line Tr1 and the second branch line Tr2 surround to form a first storage space, and the first capacitor C1 and the first connecting part L1 are arranged in the first storage space. The third branch line Tr3 and the fourth branch line Tr4 surround to form a second storage space, and the second capacitor C2 and the second connecting part L2 are arranged in the second storage space.

In the embodiment, the third branch line includes a first part Pa1, a second part Pa2, a third connecting part L3, a third part Pa3 and a fourth part Pa4. One end of the first part Pa1 is vertically electrically connected to the second transmission line T2, and one end of the second part Pa2 is vertically electrically connected to the other end of the first part Pa1. In the embodiment, a portion of a connecting angle between the second part Pa2 and the first part Pa1 can be trimmed off, as shown in FIG. 3. One end of the third connecting part L3 is vertically electrically connected to middle of the first part Pa1, and the other end of the third connecting part L3 is electrically connected to the first branch line Tr1 and the ground layer GND through the first through hole H1. The third part Pa3 is in a shape of a long strip, one end of the third part is vertically electrically connected to an outer side of the other end of the second part Pa2, and the other end of the third part Pa3 is suspended. The fourth part Pa4 is in a shape of a long strip, one end of the fourth part Pa4 is vertically electrically connected to an inner side of the other end of the second part Pa2, and the other end of the fourth part Pa4 is suspended. A length of the fourth part Pa4 is shorter than a length of the third part Pa3.

The fourth branch line includes a fifth part Pa5, a sixth part Pa6, a fourth connecting part L4, a seventh part Pa7 and an eighth part Pa8. One end of the fifth part Pa5 is vertically electrically connected to the second transmission line T2. One end of the sixth part Pa6 is vertically electrically connected to the other end of the fifth part Pa5. In the embodiment, a portion of a connecting angle between the sixth part Pa6 and the fifth part Pa5 can be trimmed off, as shown in FIG. 3. One end of the fourth connecting part L4 is vertically electrically connecting to a middle of the fifth part Pa5, and the other end of the fourth connecting part L4 is electrically connected to the second branch line Tr2 and the ground layer GND through the second through-hole H2. A seventh part is in a shape of a long strip, one end of the seventh part Pa7 is vertically electrically connected to an outer side of the other end of the sixth part Pa6, and the other end of the seventh part Pa7 is suspended. The eighth part Pa8 is in a long strip shape, one end of the eighth part Pa8 is vertically electrically connected to an inner side of the other end of the sixth part Pa6, and the other end of the eighth part Pa8 is suspended. A length of the eighth part Pa8 is longer than a length of the seventh part Pa7. An extension direction of the third part Pa3 and fourth part Pa4 of the third branch line Lr3 is opposite to an extension direction of the seventh part Pa7 and eighth part Pa8 of the fourth branch line Lr4, with alternating lengths.

In the embodiment, a structure of the first branch line Tr1 is the same as a structure of the third branch line Tr3, and will not be repeated here. A projection of the first branch line Tr1 on the substrate 20 coincides with a projection of the third branch line Tr3 on the substrate 20. A structure of the second branch line Tr2 is the same as a structure of the fourth branch line Tr4, and will not be repeated here. A projection of the second branch line Tr2 on the substrate 20 coincides with a projection of the fourth branch line Tr4 on the substrate 20.

In the embodiment, a projection of the first transmission line T1 on the substrate 20 coincides with a projection of the second transmission line T2 on the substrate 20. A projection area of the first transmission line T1 and the second transmission line T2 on the ground layer GND is hollowed out to form a hollowed out area A. A projection of the input port P1 on the substrate 20 is perpendicular to a projection of the first output port P2 on the substrate 20. A projection of the isolated port P4 on the substrate 20 is perpendicular to a projection of the second output port P3 on the substrate 20.

In the embodiment, as shown in figure, a length D1 between the second transmission line and the fourth port Pa4 is preferably 1.98 mm, and a length D2 between the first part Pa1 and the fifth part Pa5 P4 is preferably 5.44 mm. An area size of the branch-line coupler is 5.44 mm×1.98 mm=10.771 $mm^2$, while an area size of a conventional branch-line coupler is 7.97 mm×6.6 mm=52.404 $mm^2$. Compared with the conventional branch-line coupler, the branch-line coupler of the present disclosure saves 79.45% of the area size.

Figure 4:
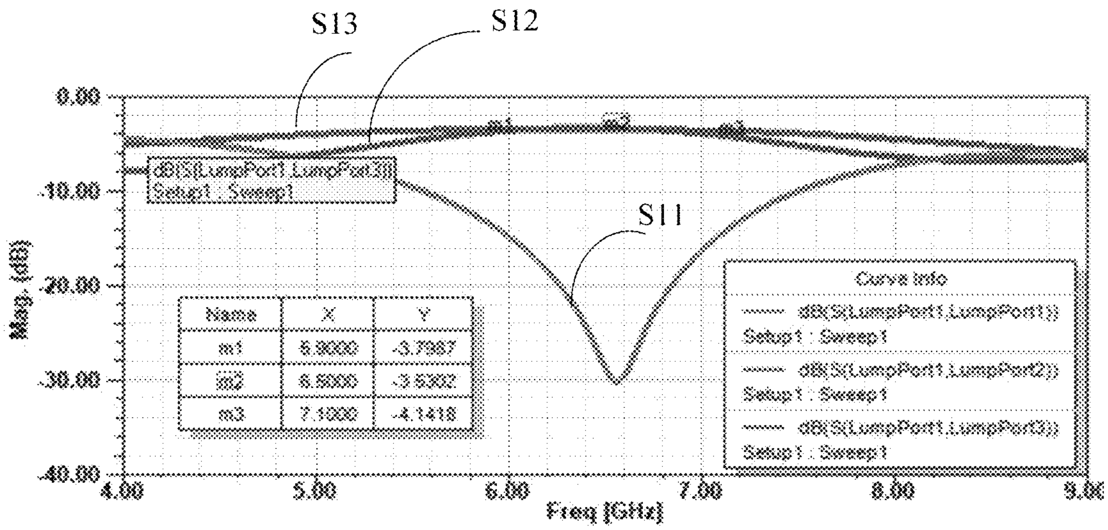
FIG. 4 is an S-parameter simulation curve of a branch-line coupler according to an embodiment of the present disclosure.

FIG. 4 is an S-parameter simulation curve of a branch-line coupler according to an embodiment of the present disclosure. In the FIG. 4, the frequency band of the branch-line coupler 10 corresponding to the parameter S11 below −10 dB is between 5.5 GHz and 7.6 GHz, the center frequency is 5.5 GHz. The parameters S12 and S13 have 3 dB power loss at that frequency band. The parameters S22, S33, and S44 of the first output port P2, second output port P3 and the isolated port P4 are approximate to parameter S11 of the input port P1. For simplicity, diagrams for S22, S33, and S44 are not given.

Figure 5:
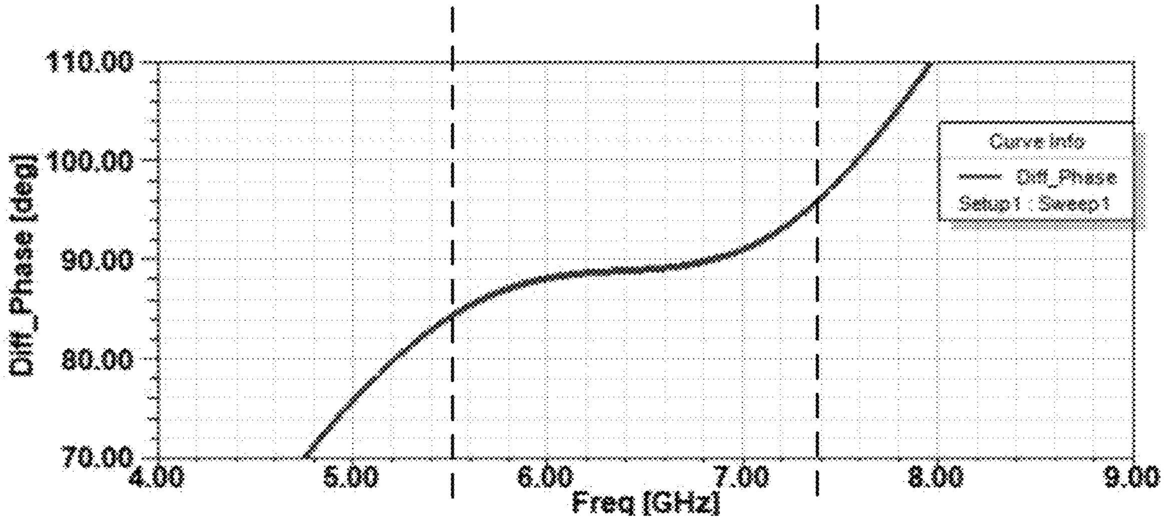
FIG. 5 is an output phase difference between a first output port and a second output port of a branch-line coupler according to an embodiment of the present disclosure.

FIG. 5 is an output phase difference between a first output port and a second output port of a branch-line coupler according to an embodiment of the present disclosure. In the FIG. 5, the first output port P2 and the second output port P3 have a small phase difference at the frequency band of 5.5 GHz to 7.4 GHz. Specifically, the output phase difference of the first output port P2 and the second output port P3 is less than 10°.

Figure 6:
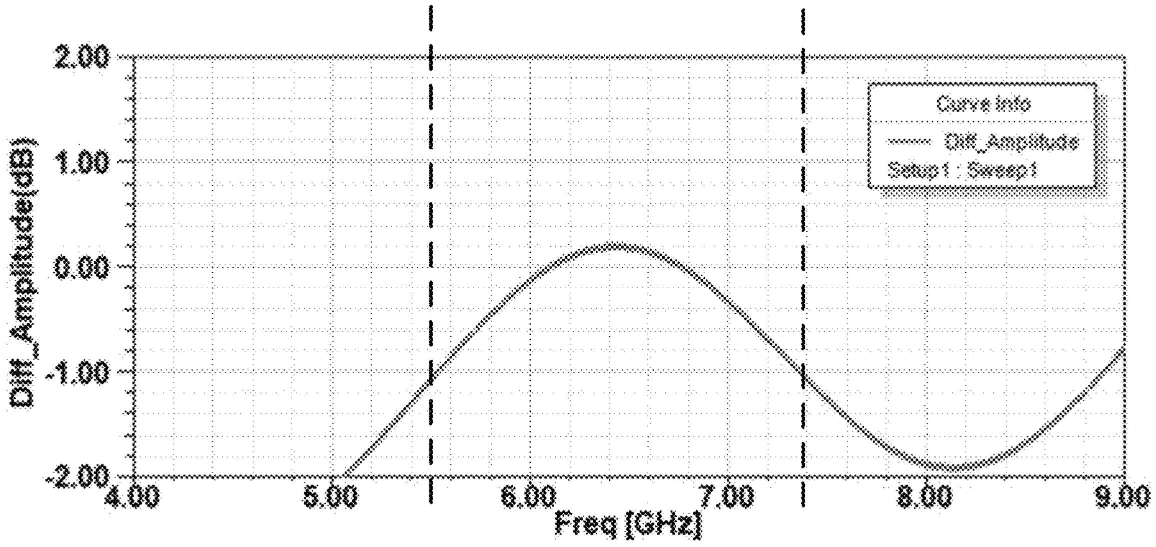
FIG. 6 is an output amplitude difference between a first output port and a second output port of a branch-line coupler according to an embodiment of the present disclosure.

FIG. 6 is an output amplitude difference between a first output port and a second output port of a branch-line coupler according to an embodiment of the present disclosure. In the FIG. 6, the first output port P2 and the second output port P3 of the branch-line coupler have a small magnitude output difference at the frequency band 5.3 GHz-7.4 GHz. Specifically, the magnitude output difference between the first output port P2 and the second output port P3 is less than 2 dB.

Compared with the prior art, the branch-line coupler provided by the embodiment of the present disclosure adopts a layered design, the branch-line coupler is arranged on the top and bottom layers of the substrate, and realizes a common ground design through through-holes. The branch-line coupler of the present disclosure decreases the area by 79.45% compared with a traditional branch-line coupler. In addition, the branch-line coupler of the present disclosure has good performance at the frequency band 4.6 GHz-6.4 GHz, and the attenuation of parameter S11 is greater than 10 dB. The output amplitude and phase difference of the two output ports have little difference. After overcoming the shortcomings of the existing technology to occupy a large PCB area, it has better characteristics and is suitable for application in mobile communication products. The branch-line coupler of the present disclosure not only overcomes the disadvantage of occupying a large PCB area, but also has good performance, and is very suitable for mobile communication products.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A branch-line coupler, applicable in microwave circuits, wherein the branch-line coupler is arranged on a substrate, the substrate comprising a top layer, a bottom layer, and an intermediate layer, and the branch-line coupler comprising:

an input port, arranged on the bottom layer of the substrate;

an isolated port, arranged on the bottom layer of the substrate;

a first output port, arranged on the top layer of the substrate;

a second output port, arranged on the top layer of the substrate;

a ground layer, arranged in the intermediate layer of the substrate;

a first transmission line, electrically connected between the input port and the isolation port;

a second transmission line, electrically connected between the first output port and the second output port;

a first branch line, electrically connected to the input port;

a second branch line, electrically connected to the isolated port;

a third branch line, vertically electrically connected to the first output port; and a fourth branch line, vertically electrically connected to the second output port, wherein the first branch line and the third branch line are electrically connected through a first through hole, and the second branch line and the fourth branch line are connected through a second through hole;

a first connecting part, arranged on the bottom layer of the substrate;

a first capacitor, arranged on the bottom layer of the substrate, wherein one end of the first capacitor is electrically connected to the first transmission line, and another end of the first capacitor is electrically connected to the first connecting part.

2. The branch-line coupler according to claim 1, further comprising:

a second connecting part, arranged on the top layer of the substrate and electrically connected to the ground layer and the first connecting part through a third through hole;

a second capacitor, arranged on the top layer of the substrate, wherein one end of the second capacitor is electrically connected to the second transmission line, and another end of the second capacitor is electrically connected to the second connecting part.

3. The branch-line coupler according to claim 2, wherein:

the first branch line and the second branch line surround to form a first storage space configured for storing the first capacitor and the first connecting part;

the third branch line and the fourth branch line surround to form a second storage space configured for storing the second capacitor and the second connecting part.

4. The branch-line coupler according to claim 1, wherein the third branch line comprises:

a first part, one end of the first part is vertically electrically connected to the second transmission line;

a second part, one end of the second part is vertically electrically connected to another end of the first part;

a third connecting part, one end of the third connecting part is vertically electrically connected to middle of the first part, and another end of the third connecting part is electrically connected to the first branch line and the ground layer through the first through hole;

a third part, in a shape of a long strip, one end of the third part is vertically electrically connected to an outer side of the other end of the second part, and another end of the third part is suspended;

a fourth part, in a shape of a long strip, one end of the fourth part is vertically electrically connected to an inner side of the other end of the second part, and another end of the fourth part is suspended, and a length of the fourth part is shorter than a length of the third part.

5. The branch-line coupler according to claim 1, wherein a structure of the first branch line is same as a structure of the third branch line, and a projection of the first branch line on the substrate coincides with a projection of the third branch line on the substrate.

6. The branch-line coupler according to claim 1, wherein the fourth branch line comprises:

a fifth part, one end of the fifth part is vertically electrically connected to the second transmission line;

a sixth part, one end of the sixth part is vertically electrically connected to another end of the fifth part;

a fourth connecting part, one end of the fourth connecting part is vertically electrically connecting to a middle of the fifth part, and another end of the fourth connecting part is electrically connected to the second branch line and the ground layer through the second through-hole;

a seventh part, in a first long strip shape, one end of the seventh part is vertically electrically connected to an outer side of another end of the sixth part, and the other end of the seventh part is suspended;

an eighth part, in a second long strip shape, one end of the eighth part is vertically electrically connected to an inner side of the other end of the sixth part, and another end of the eighth part is suspended, and a length of the eighth part is longer than a length of the seventh part.

7. The branch-line coupler according to claim 1, wherein a structure of the second branch line is the same as a structure of the fourth branch line, and a projection of the second branch line on the substrate coincides with a projection of the fourth branch line on the substrate.

8. The branch-line coupler according to claim 1, wherein:

a projection of the first transmission line on the substrate coincides with a projection of the second transmission line on the substrate;

a projection area of the first transmission line and the second transmission line on the ground layer is hollowed out.

9. The branch-line coupler according to claim 1, wherein:

the input port and the isolated port are each vertically electrically connected to the first transmission line.

10. The branch-line coupler according to claim 1, wherein:

a projection of the input port on the substrate is perpendicular to a projection of the first output port on the substrate;

a projection of the isolated port on the substrate is perpendicular to a projection of the second output port on the substrate.

* * * * *